(12) United States Patent
Schüler

(10) Patent No.: US 7,726,744 B2
(45) Date of Patent: Jun. 1, 2010

(54) MOTOR-DRIVEN ACTUATOR FOR A VEHICLE SEAT

(75) Inventor: Rolf Schüler, Heiligenhaus (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 12/291,967

(22) Filed: Nov. 14, 2008

(65) Prior Publication Data
US 2009/0072602 A1    Mar. 19, 2009

Related U.S. Application Data

(60) Provisional application No. PCT/EP2007/003884, filed on May 3, 2007.

(30) Foreign Application Priority Data
May 19, 2006    (DE) .................. 10 2006 023 536

(51) Int. Cl.
B60N 2/02      (2006.01)
H02K 5/10      (2006.01)
H02K 15/14     (2006.01)

(52) U.S. Cl. .................. 297/362.11; 310/85; 29/596

(58) Field of Classification Search .................. 310/85; 29/596; 297/362.11, 361.1, 330
See application file for complete search history.

(56) References Cited

U.S. PATENT DOCUMENTS 4,228,698 A    10/1980   Winiasz
5,634,689 A *  6/1997   Putsch et al. ............... 297/362
6,563,245 B1   5/2003   Suzuki et al.
6,799,806 B2   10/2004  Eppert et al.
7,329,200 B2 * 2/2008   Schuler et al. ............ 475/150
2007/0029893 A1 2/2007  Schuler et al.

FOREIGN PATENT DOCUMENTS

| DE | 44 36 101 A1 | 6/1995 |
| DE | 100 45 549 A1 | 3/2001 |
| DE | 101 05 282 A1 | 8/2002 |
| DE | 101 39 217 A1 | 3/2003 |
| DE | 101 41 891 A1 | 3/2003 |
| DE | 10 2004 019 466 A1 | 11/2005 |
| EP | 0 450 324 B1 | 10/1991 |

* cited by examiner

Primary Examiner—Milton Nelson, Jr.
(74) Attorney, Agent, or Firm—Womble Carlyle Sandridge & Rice, PLLC

(57) ABSTRACT

A motor-driven actuator for a vehicle, in particular for a vehicle seat, is for being situated between two components of the vehicle or vehicle seat that can be displaced in relation to one another. The motor-driven actuator comprises a motor, at least one first gear stage that is located on the output side of the motor, a second gear stage that acts as a load-bearing gear and is located on the output side of the first gear stage, and at least one sealing element. The motor, gear stages and sealing element are integrated into the motor-driven actuator. The sealing element is adapted for being in a predetermined sealing configuration for protecting the motor and/or its electrical contact and/or at least one of the gear stages during manufacturing. The sealing element is adapted for not being in the predetermined sealing configuration when the motor-driven actuator is installed and ready to operate.

21 Claims, 2 Drawing Sheets

MOTOR-DRIVEN ACTUATOR FOR A VEHICLE SEAT

CROSS-REFERENCE TO RELATED APPLICATION

The present application is a continuation of International Application PCT/EP2007/003884, which was filed May 3, 2007. The entire disclosure of International Application PCT/EP2007/003884, which was filed May 3, 2007, is incorporated herein by reference.

TECHNICAL FIELD

The present invention relates to a motor-driven actuator for a vehicle or a vehicle seat, in particular a motor vehicle seat, having a motor, a first gear stage arranged on the output side of the motor, and a second gear stage that is arranged on the output side of the first gear stage and acts as a load-bearing gear, wherein the motor and gear stages are integrated into the motor-driven actuator.

BACKGROUND OF THE INVENTION

DE 10 2004 019 466 A1 discloses a motor-driven actuator of the type described in the Technical Field section of this disclosure, in which an electronically commutated motor and a differential gear (i.e., a first gear stage) are integrated spatially and functionally into a load-bearing gear (i.e., a second gear stage).

BRIEF SUMMARY OF SOME ASPECTS OF THE INVENTION

An aspect of the present invention is the provision of improvements to a motor-driven actuator of the type described in the Technical Field section of this disclosure. In accordance with one aspect of the present invention, a motor-driven actuator, which may be for causing relative movement between components of a vehicle or a vehicle seat, includes a motor (e.g., an electronically commutated motor) having an output side, at least one first gear stage that is arranged on the output side of the motor and has an output side, a second gear stage that is arranged on the output side of the first gear stage and is for acting as a load-bearing gear, and at least one sealing element, wherein each of the motor, the first and second gear stages and the sealing element is integrated into the motor-driven actuator (e.g., integrated into a common housing of the motor-driven actuator). The sealing element is adapted for being in a predetermined sealing configuration for protecting the motor and/or its electrical contact and/or at least one of the gear stages during manufacturing of the motor-driven actuator. The sealing element is adapted for not being in the predetermined sealing configuration when the motor-driven actuator is installed and ready to operate.

The motor-driven actuator according to an exemplary embodiment of the invention forms a small, compact, inseparable, preassemblable unit comprising a motor which, at a low driving torque, requires little power and takes up little overall space, and an at least two-stage, high step-down gear into which the load-bearing gear (i.e., the gear located in the power flux, in the exemplary embodiment in the power flux between the two components which are movable relative to each other) is integrated.

The integrated sealing element, which the assembled motor-driven actuator has during manufacture to protect the motor and/or its electrical contact and/or at least one of the gear stages, allows the components of the motor-driven actuator to be subjected, when assembled, to aggressive surface treatment without the sensitive electronic and mechanical parts becoming damaged. If the sealing element is removed from the installed motor-driven actuator, free spaces (e.g., open spaces) for compensating for play or compensating for wobbling can be provided—while maintaining the sealing effect during the aggressive portions of the surface treatment.

The free spaces also reduce the friction and thus the operating costs of the motor-driven actuator. The assembly effort and thus the assembly costs are kept low both with regard to caps, or the like, which are briefly fitted for the aggressive portions of the surface treatment, and with regard to a change in the process sequence, in which the sensitive parts are installed only after the aggressive portions of the surface treatment.

During the assembly of the motor-driven actuator, the sealing element is introduced as a separate component, for example in the form of a seal, or configured on another component, for example formed integrally as a thin material layer or via a material constriction. Preferably, a plurality of sealing elements are provided. Some of the sealing elements present can be provided in one way, while other of the sealing elements may be provided in another way. The sealing elements which are present ensure that, during the aggressive portions of the surface treatment (e.g., cleaning and/or painting), the motor-driven actuator forms a system comprising closed interfaces, whereas the removed sealing elements make the motor-driven actuator into a system comprising open—mechanical and electrical—interfaces, namely comprising at least one output and at least one electrical contact.

The sealing element can be removable by heat, for example by making it of (e.g., entirely of) a thermoplastic or similar material which is present during the aggressive portions of the surface treatment (e.g., the cleaning and/or painting), but is automatically removed or shrinks during the non-aggressive final portions of the surface treatment, for example drying or another heat treatment. Preferably, the thermoplastic material of the sealing element shrinks or liquefies (e.g., melts) or softens during the drying or other heat treatment and is removed from the previously sealed space by gravity or capillary action, preferably into cavities provided for this purpose in the housing.

However, the sealing element can also be mechanically removable, for example by forming it as a thin sheet or by providing a predetermined breaking point or a film hinge to a component of the motor-driven actuator, the sealing element being destroyed, broken out, opened, wholly or partially folded down or otherwise removed prior to the installation, by the installation or by the putting into operation of the motor-driven actuator at its intended location. If the sealing element is provided on a connector of an electrical contact, it can be removed by the fitting, which is necessary anyway, of a mating contact. If the sealing element is provided on an entrainment means or other drive element, it can be removed by the fitting, which is necessary anyway, of a transmission rod.

Combinations of both variations are also possible, for example temporally in that the sealing element is first removed as far as possible by a heat treatment and the remaining remnants are then removed by the mechanical treatment or vice versa, or for example spatially in that, in the case of a plurality of sealing elements, some are removed by heat and others mechanically.

The first gear stage is preferably configured as a circular thrust gear (surface pressure gear) comprising guide elements secured to the housing for the pinion and simple rotation of the gear-wheel, such as is disclosed, for example, in U.S. Pat.

No. 4,228,698 A. However, the first gear stage can also be configured as an Oldham coupling (cross-crank gear) such as is described, for example, in EP 0 450 324 B1. Because of the circular thrust movement, the teeth do not need to have any involutes to generate linear contact but can instead be flat and thus withstand much higher loads. The meshing of a plurality of teeth, and thus reduction of the torsional face backlash, is also advantageous in this regard. If there is any imbalance in the gear stages, mass compensation can be provided, thus ensuring a harmonic path.

Apart from its disc shape, the second gear stage is designed like the load-bearing gear such as is described in DE 10 2004 019 466 A1, i.e. two fitting parts which are joined together by a (preferably self-locking) eccentric path gear (for securing and adjusting) perform relative to each other a rotational movement with superimposed wobbling. If the fitting parts are not disc-shaped, at most a small portion of the second gear stage can be integrated into the housing. In all of the variations of the second gear stage, it is conceivable to provide a further gear stage, for example between the first and the second gear stage.

A hollow shaft design allows simple connection of a transmission rod between opposite sides of a vehicle seat, preferably by a profiled central receptacle in the drive component for the load-bearing gear, i.e. in the exemplary embodiment the entrainment means of the second gear stage.

Other aspects and advantages of the present invention will become apparent from the following.

BRIEF DESCRIPTION OF THE DRAWINGS

The invention will be described hereinafter in greater detail with reference to an exemplary embodiment illustrated in the drawings, in which.

DETAILED DESCRIPTION OF EXEMPLARY EMBODIMENT

Figure 4:
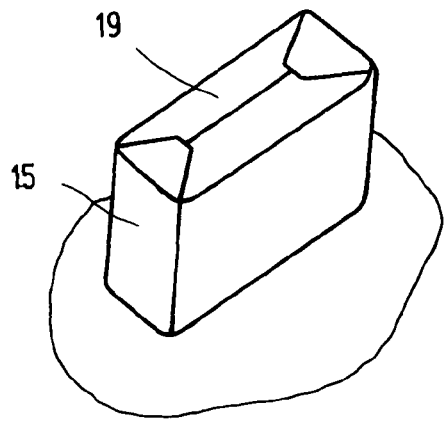
FIG. 4 is a perspective view of a connector comprising a sealing element.

A motor-driven actuator 1 for a vehicle seat 2, for example of a motor vehicle seat, has a motor housing 3. A rotatably mounted rotor 6 is inside the motor housing 3, and the rotor's axis of rotation is referred to as the main axis A and defines the directional indications used hereinafter. A stator 7 is arranged inside of, and is fixedly mounted to, the motor housing 3. The rotor 6, which is configured as a hollow shaft, carries/holds on it outside a plurality of permanent magnets that extends in the circumferential direction. The stator 7, with its plurality of stator poles and winding stacks, is arranged radially outwardly of the permanent magnets of the rotor 6. The rotor 6 and the stator 7 together form an electronically commutated motor 11 which is integrated into the motor-driven actuator 1. A printed circuit board 13, which is arranged in the motor housing 3 axially offset from the stator 7, is provided for electronically commutating the stator 7. Alternatively, the motor can be brush-commutated. At least one connector 15, which in the exemplary embodiment protrudes axially from the motor housing 3, is attached or formed integrally with the motor housing 3. The inside of the connector 15 surrounds at least one electrical contact 17 which is connected to the printed circuit board 13. During manufacture of the motor housing 3, the connector 15 is configured with a lid, referred to hereinafter as the first sealing element 19, as illustrated in FIG. 4. A material constriction in the form of a predetermined breaking point or a film hinge is preferably provided between the first sealing element 19 and the plug 15, or the first sealing element 19 is configured in its entirety as a thin sheet.

The motor-driven actuator 1 has an integrated first gear stage 21. The first gear stage 21 is based on the operative principle of a circular thrust gear (surface pressure gear) and is arranged on the output side of the motor 11. For providing the output from the motor 11, the rotor 6 is extended axially beyond the stator 7, where the rotor 6 is provided axially in succession with two radially protruding cams, or the like, which are arranged offset from each other by 180° in the circumferential direction. A gear-wheel 24 is mounted on each of these cams, forming respective eccentrics of the rotor 6. The two gear-wheels 24, which are arranged axially one after the other, mesh with a common internal gear-wheel 25, the engagement—which is brought about by the mounting of the gear-wheels 24—being carried out at two opposing points of the internal gear-wheel 25. The internal gear-wheel 25 is rigidly connected to the motor housing 3. The gear-wheels thus perform, when driven by the rotor 6, a rotational movement with superimposed wobbling.

Figure 1:
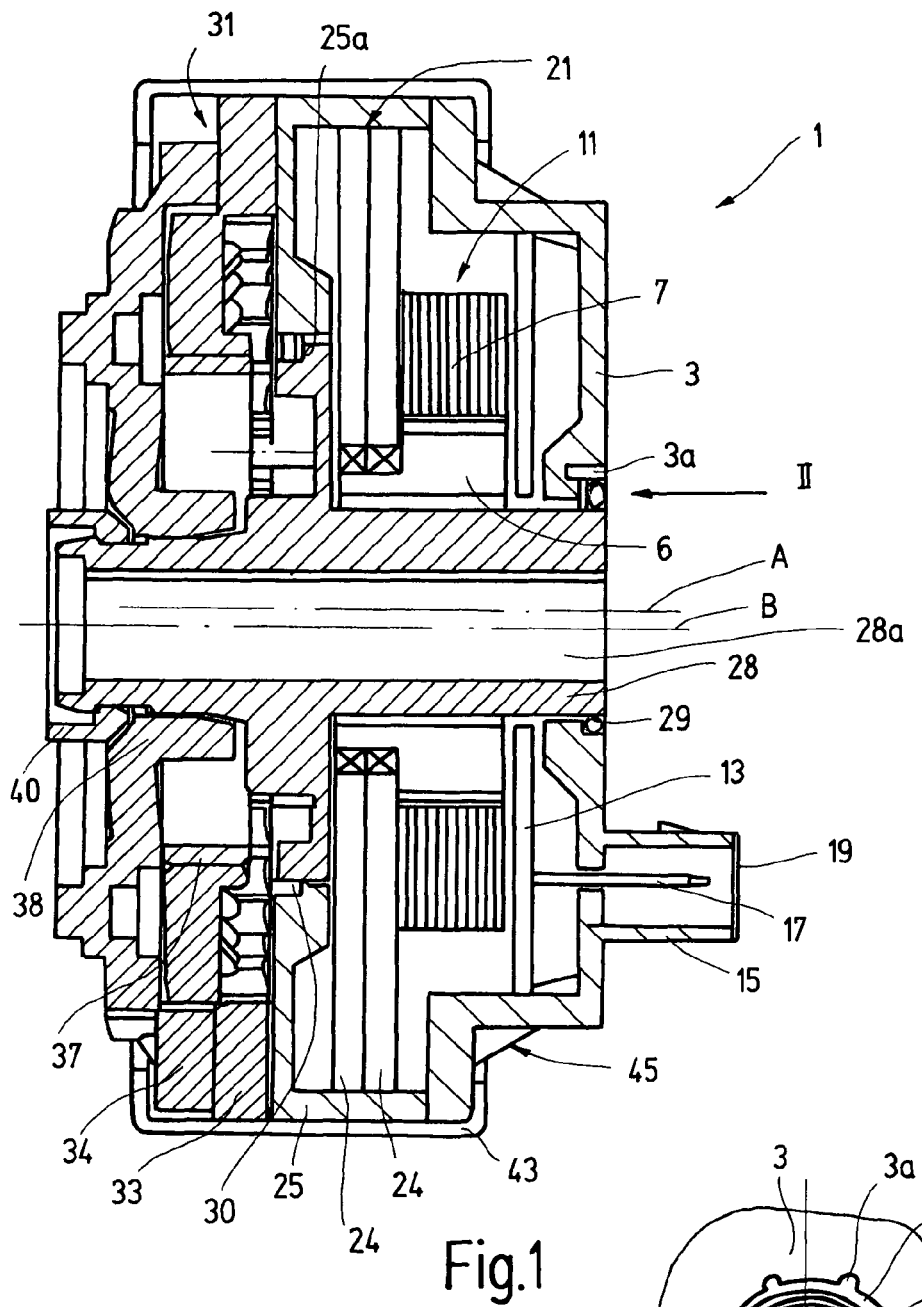
FIG. 1 is a longitudinal section through the exemplary embodiment.
Figure 3:
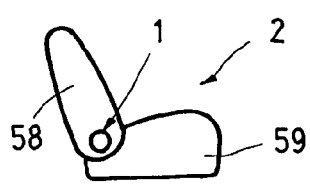
FIG. 3 is a schematic side view of a vehicle seat.
Figure 2:
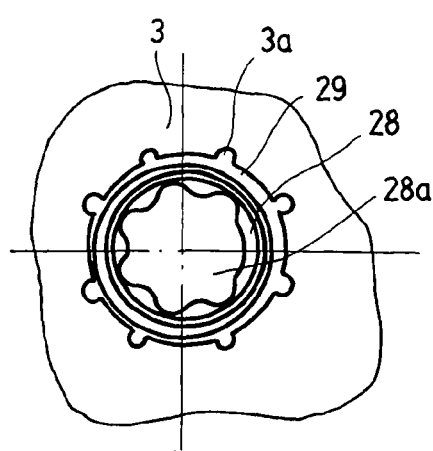
FIG. 2 is a partial view in the direction indicated by the arrow II in FIG. 1.

An entrainment means 28 (e.g., hollow shaft) is provided as the output of the first gear stage 21. In accordance with the exemplary embodiment, the entrainment means 28 is a hollow shaft and extends preferably over the entire axial length of the motor-driven actuator 1. The entrainment means 28 is arranged over a portion of its length inside the rotor 6 which it mounts. During assembly, a seal, referred to hereinafter as the second sealing element 29, is introduced between the entrainment means 28 and the motor housing 3 at the end of the entrainment means 28 that faces outward at the motor housing 3. The motor housing 3 has at this location cavities 3a, as illustrated in FIG. 2.

At the end of the rotor 6 that is remote from the printed circuit board 13, the entrainment means 28 has a radially outwardly protruding flange which is arranged radially inside a radially inwardly protruding flange of the internal gear-wheel 25. During assembly, a further seal, referred to hereinafter as the third sealing element 30, is introduced between the entrainment means 28 and the internal gear-wheel 25 between the flanges. The internal gear-wheel 25 has cavities 25a at this location. A plurality of guide elements, for example bolts, which each reach with play into a corresponding number of openings in each gear-wheel 24, protrude axially from the flange of the entrainment means 28. The fact that the gear-wheels 24 are arranged offset through 180° in the circumferential direction gives rise to a clear and transverse force-free arrangement of the guide elements that compensates for the wobbling of the gear-wheels and leads to pure rotational movement of the entrainment means 28 about the main axis A.

The entrainment means 28 is at the same time part of a second gear stage 31. The second gear stage 31 has a first fitting part 33 comprising a gear-wheel, which is concentric with the main axis A, and a second fitting part 34 comprising a gear rim. The first and second fitting parts 33, 34 mesh with each other to form an eccentric path gear. The first and second fitting parts 33, 34 are driven by an eccentric to provide a relative roll-off movement, one on the other, consisting of a rotational movement and superimposed wobbling. The eccentric is formed by the entrainment means 28 and a wedging system for blocking and releasing play. An eccentric path gear of this type is in principle described in DE 44 36 101 A1. The entire disclosure of DE 44 36 101 A1 is explicitly incorporated herein by reference. The disc shape, used in the exemplary embodiment, of the second gear stage 31 is described in DE 101 05 282 A1. The entire disclosure of DE 101 05 282 A1 is also explicitly incorporated herein by reference.

On the one hand, the eccentric, formed with the involvement of the entrainment means 28, is mounted in a sliding bearing bush 37 pressed into the first fitting part 33. On the other hand, the entrainment means 28 is mounted in a collar 38 and axially secured to the second fitting part 34 by way of a clipped-on annular clip 40, so that the entrainment means 28 is rotatable relative to the second fitting part 34. The second fitting part 34 and the collar 38 together are concentric with a secondary axis B which is arranged offset in parallel to the main axis A and defines the wobbling. The first fitting part 33 is rigidly connected to the internal gear-wheel 25 and thus to the motor housing 3. A clasping ring 43 is rigidly connected to the motor housing 3, the internal gear-wheel 25 and the first fitting part 33, thus forming a common housing 45. The clasping ring 43 overlaps the second fitting part 34 at its radially outer edge, with sliding elements optionally being inserted to reduce the friction.

Once the motor-driven actuator 1 has been produced in the described manner by assembling the motor 11 and the two gear stages 21, 31, and has been integrated into the common housing 45, it is first subjected in its entirety to cleaning, more specifically degreasing, either in a dipping bath or using a spraying process. The motor-driven actuator 1 is then subjected in its entirety to painting, also either in a dipping bath or using a spraying process. During both the cleaning and the painting, the three sealing elements 19, 29 and 30 (e.g. substantially remain in their predetermined sealing configurations to) respectively protect the electrical contact 17, the interior of the motor housing 3 and the internal gear-wheel 25 (and thus the components of the motor 11 and first gear stage 21) from contact with the cleaning agent and the paint, and thus from impairment of the product properties. The sealing elements 19, 29 and 30 thus seal the motor 11, its electrical contact 17 and the first gear stage 21.

After the painting, the motor-driven actuator 1 is subjected to drying in a drying oven, i.e. it is heat-treated. The components of the motor 11 and the first gear stage 21 have no difficulty withstanding the used temperature of from approximately 140 to 160° C., as they are designed for similarly high operating temperature peaks. According to the exemplary embodiment of the invention, the two sealing elements 29 and 30 consist of a thermoplastic material, the melting point of which corresponds to or is less than the temperature of the drying oven. The sealing elements 29 and 30 thus liquefy (e.g., melt) in the drying oven (e.g., so that they are no longer in their original predetermined sealing configurations). The material of the sealing elements 29 and 30 can flow from the previously sealed space into the cavities 3a and 25a which are initially kept free (e.g., open). For example, flowing of the material of the sealing elements 29 and 30 can occur automatically because of the capillary action if the volume of the cavities 3a and 25a is low. In order to keep the cavities 3a and 25a free (e.g., open) during introduction of the sealing elements 29 and 30, there may be provided, for example, placeholders which are subsequently removed or fall out when the sealing elements 29 and 30 liquefy. The previously sealed space is then available to the entrainment means 28 as a free space (e.g., an open space) for compensating for play or compensating for wobbling. In a modification, the material of the sealing elements 29 and 30 can shrink during the drying or other heat treatment and at least partially release (e.g., open) the previously sealed space. In all cases, the previously present contact forces between the parts to be sealed are eliminated.

Figure 5A:
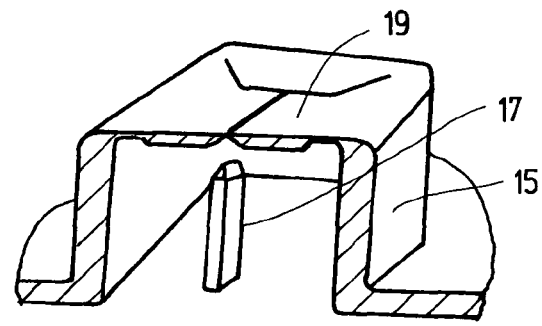
FIGS. 5a to 5c show the opening of the sealing element on the connector by the introduction of a mating connector.
Figure 5B:
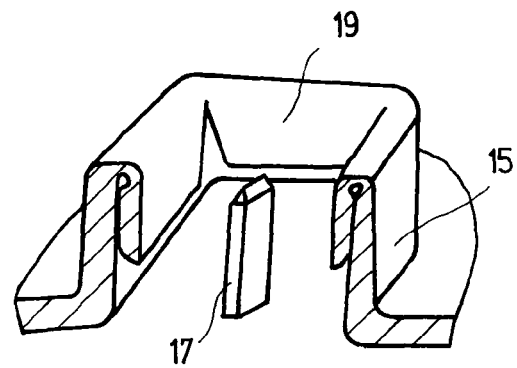
Figure 5C:
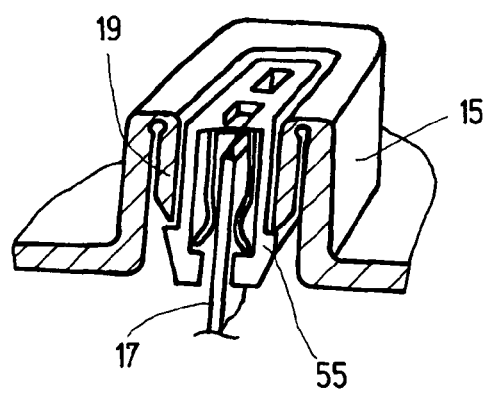

The motor-driven actuator 1 can then be installed at its intended location and become ready for operation. For electrical connection, a tool, or preferably the mating connector to be plugged into or onto the connector 15, is used to destroy, break out, wholly or partially fold down or otherwise remove the first sealing element 19 (e.g., so that it is no longer in its original predetermined sealing configuration) and to insert or slide on the mating connector 55. The steps are illustrated schematically in FIGS. 5a to 5c. Folded-down parts of the first sealing element 19 preferably act as a lock for the mating connector 25. The first sealing element 19 can also be removed by heat, i.e. like the sealing elements 29 and 30. The heat treatment for removing the first sealing element 19 can be provided as an alternative to mechanical removal or in preparation therefor. In the latter variation, the tool or the mating connector 55 would eliminate only the remnants of the first sealing element 19.

Figure 6:
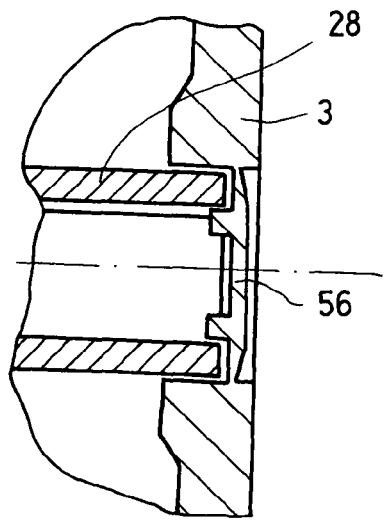
FIG. 6 is a section through a modified sealing element.

The entrainment means 28 has a profiled receptacle 28a which is concentric with the secondary axis B. This receptacle 28a can non-rotationally receive a transmission rod in order to synchronously drive a single second gear stage 31 on the other side of the vehicle seat. The two vehicle seat sides can also be synchronized by electronic commutation. In a modified embodiment according to FIG. 6, the entrainment means 28 can also be covered at its end face, in particular the open receptacle 28a, by a fourth sealing element 56 in the manner of the first sealing element 19. The fourth sealing element 56 may be connected to the motor housing 3 or another component, in particular of the housing 45, by way of a material constriction, for example in the form of a predetermined breaking point or a film hinge. The fourth sealing element 56 replaces the above-described second sealing element 29. Rotating the entrainment means 28 or introducing the transmission rod breaks off this fourth sealing element 56 and thus removes it (e.g., so that it is no longer in its original predetermined sealing configuration). It is also possible for heat treatment to remove, or prepare for the removal of, the fourth sealing element 56.

The second gear stage 31 acts as a load-bearing gear which is located in the power flux between the two components of the vehicle seat 2 that are to be moved relative to each other by the motor-driven actuator 1. The second gear stage 31 absorbs and passes on the forces, especially in the event of a crash. The motor-driven actuator 1 according to the exemplary embodiment of the invention can, for example, be used to adjust the angle of inclination of a backrest 58 of the vehicle seat 2 relative to a seat part 59 of the vehicle seat 2, so the second gear stage 41 is located in the power flux between the backrest 58 and the seat part 59. For example, the common housing 45 is connected to the structure of the seat part 59, whereas the second fitting part 34, as the output, is connected to the structure of the backrest 58.

However, the motor-driven actuator 1 can also be used to adjust the height of the seat part 59. For example, the motor-driven actuator 1 may act between a rocker (e.g., pivotable support) on the one hand and a seat frame or a seat rail on the other hand. Additional possible uses of the motor-driven actuator between other components of the vehicle seat 2 that are movable relative to one another are possible.

It will be understood by those skilled in the art that while the present invention has been discussed above with reference to an exemplary embodiment, various additions, modifications and changes can be made thereto without departing from the spirit and scope of the invention as set forth in the following claims.

That which is claimed:

1. A motor-driven actuator for causing relative movement between components of a vehicle or a vehicle seat, the motor-driven actuator comprising:
   a motor that is integrated into the motor-driven actuator and includes an output side;
   at least one first gear stage that is integrated into the motor-driven actuator and is arranged on the output side of the motor, wherein the first gear stage has an output side;
   a second gear stage that is integrated into the motor-driven actuator and is arranged on the output side of the first gear stage, wherein the second gear stage is for acting as a load-bearing gear; and
   at least one sealing element that is integrated into the motor-driven actuator,
   the sealing element being adapted for being in a predetermined sealing configuration for protecting at least one component during manufacturing of the motor-driven actuator, the at least one component being selected from the group consisting of the motor, an electrical contact for the motor, the first gear stage and the second gear stage, and
   the sealing element being adapted for not being in the predetermined sealing configuration when the motor-driven actuator is installed and ready to operate.

2. The motor-driven actuator according to claim 1, wherein the sealing element comprises a material that is operative for sealing against an aggressive surface treatment.

3. The motor-driven actuator according to claim 2, wherein:
   the sealing element defines a sealed space of the motor-driven actuator;
   the material of the sealing element is a thermoplastic material;
   the thermoplastic material of the sealing element is operative for being automatically removed, automatically shrunken, or any combination thereof in response to heating that occurs after the aggressive surface treatment; and
   the motor-driven actuator is configured so that the sealed space of the motor-driven actuator becomes an open space of the motor-driven actuator in response to the thermoplastic material of the sealing element being automatically removed, automatically shrunken, or any combination thereof.

4. The motor-driven actuator according to claim 3, wherein the thermoplastic material of the sealing element is operative for melting, softening, or any combination thereof during the heating, so that the thermoplastic material of the sealing element is at least partially removed from the sealed space by capillary action.

5. The motor-driven actuator according to claim 2, wherein:
   the material of the sealing element is a thermoplastic material, and
   the aggressive surface treatment comprises cleaning, painting, or any combination thereof.

6. The motor-driven actuator according to claim 1, wherein the sealing element is operative for being destroyed, broken out, opened, wholly folded down, partially folded down, otherwise removed, or any combination thereof at one or more occurrences selected from the group consisting of:
   prior to the motor-driven actuator being installed,
   by the motor-driven actuator being installed, and
   by the motor-driven actuator being put into operation.

7. The motor-driven actuator according to claim 6, wherein the sealing element is:
   provided on a connector of the motor-driven actuator, and
   is operative for being removed by a mating connector being connected to the connector of the motor-driven actuator.

8. The motor-driven actuator according to claim 1 in combination with the components, wherein:
   a first of the components is a seat part of the vehicle seat;
   a second of the components is a backrest of the vehicle seat; and
   the motor-driven actuator is mounted between the seat part and the backrest.

9. The motor-driven actuator according to claim 1, comprising:
   a housing, and
   the motor, the first gear stage and the second gear stage being integrated into the housing.

10. The motor-driven actuator according to claim 1, wherein the sealing element is configured in its entirety as a thin sheet, is connected to a component of the motor-driven actuator via a predetermined breaking point, is connected to a component of the motor-driven actuator via a film hinge, is connected to a component of the motor-driven actuator via a predetermined breaking point, is connected to a component of the motor-driven actuator via a material constriction, or any combination thereof.

11. A method for manufacturing a motor-driven actuator that is for causing relative movement between components of a vehicle or a vehicle seat, the method for manufacturing the motor-driven actuator comprising:
   assembling the motor-driven actuator so that the motor-driven actuator includes
      a motor that is integrated into the motor-driven actuator and includes an output side,
      at least one first gear stage that is integrated into the motor-driven actuator and is arranged on the output side of the motor, wherein the first gear stage has an output side,
      a second gear stage that is integrated into the motor-driven actuator and is arranged on the output side of the first gear stage, wherein the second gear stage is for acting as a load-bearing gear, and
      at least one sealing element that is integrated into the motor-driven actuator so that the sealing element is in a predetermined sealing configuration for protecting at least one component selected from the group consisting of the motor, an electrical contact for the motor, the first gear stage and the second gear stage;
   then subjecting the motor-driven actuator to an aggressive surface treatment while the sealing element is in the predetermined sealing configuration, wherein the sealing element substantially remains in the predetermined sealing configuration while the motor-driven actuator is subjected to the aggressive surface treatment, so that the sealing element protects the at least one component from the aggressive surface treatment; and
   then further manufacturing the motor-driven actuator, comprising causing the sealing element to no longer be in the predetermined sealing configuration.

12. The method according to claim 11, wherein the further manufacturing of the motor-driven actuator comprises subjecting the motor-driven actuator to heat treatment.

13. The method according to claim 12, wherein the step of causing the sealing element to no longer be in the predetermined sealing configuration comprises melting material of the sealing element, softening material of the of the sealing element, shrinking material of the sealing element, or any combination thereof, in response to the heat treatment.

14. The method according to claim 13, wherein the step of causing the sealing element to no longer be in the predetermined sealing configuration comprises causing material of the sealing element to flow into a cavity of the motor-driven actuator.

15. The method according to claim 12, wherein:
the step of subjecting the motor-driven actuator to the heat treatment comprises drying the motor-driven actuator; and
the step of subjecting the motor-driven actuator to the aggressive surface treatment comprises cleaning the motor-driven actuator, painting the motor-driven actuator, or any combination thereof.

16. The method according to claim 11, wherein the step of causing the sealing element to no longer be in the predetermined sealing configuration comprises causing the sealing element to be at least partially destroyed, at least partially removed, or any combination thereof.

17. The method according to claim 16, wherein the step of causing the sealing element to be at least partially destroyed, at least partially removed, or any combination thereof, is by way of at least one occurrence selected from the group consisting of:
a transmission rod being inserted, and
a mating connector being plugged in, plugged on, or any combination thereof.

18. The method according to claim 11, comprising the sealing element defining a sealed space of the motor-driven actuator while the sealing element in the predetermined sealing configuration, wherein the step of causing the sealing element to no longer be in the predetermined sealing configuration comprises opening the sealed space.

19. The method according to claim 18, wherein the step of opening the sealed space comprises shrinking the sealing element, melting the sealing element, softening the sealing element, or any combination thereof.

20. The method according to claim 18, wherein the step of opening the sealed space comprises mechanically acting upon the sealing element.

21. The method according to claim 20, wherein the step of mechanically acting upon the sealing element comprises pushing the sealing element inwardly.

* * * * *